HYDROSTATIC BEARING

Original Filed April 13, 1970 2 Sheets-Sheet 1

INVENTOR

Terence N. Dubinsky by Dressler, Goldsmith, Clement and Gordon Att'ys

HYDROSTATIC BEARING

Original Filed April 13, 1970 2 Sheets-Sheet 2

United States Patent

Re. 28,401
Reissued Apr. 29, 1975

28,401
HYDROSTATIC BEARING

Terence N. Dubinsky, Racine, Wis., assignor to
J. I. Case Company, Racine, Wis.

Original No. 3,671,155, dated June 20, 1972, Ser. No. 27,472, Apr. 13, 1970. Application for reissue June 10, 1974, Ser. No. 477,789
Int. Cl. F01c *21/04;* F16c *13/02, 33/66*
U.S. Cl. 418—73 4 Claims

Matter enclosed in heavy brackets [ ] appears in the original patent but forms no part of this reissue specification; matter printed in italics indicates the additions made by reissue.

ABSTRACT OF THE DISCLOSURE

The present disclosure relates to an apparatus for supporting a rotating element relative to a housing of a fluid translating device by primary and secondary bearing means.

The secondary bearing means includes first and second sleeves surrounding the rotor supporting shaft with each of the sleeves having a plurality of outer recesses cooperating with the housing to produce pockets or chambers and a plurality of inner recesses cooperating with the shaft to produce inner pockets or chambers. Each outer pocket receives diverted pressured fluid from the port which is in opposed relationship on the rotor or shaft and the outer pocket communicates with the inner pocket to direct this fluid into the area between the shaft and the bearing sleeve. The internal surface of the sleeve has two opposed circular segments having equal radii with the centers of the segments spaced from each other with the radii being substantially equal to the diameter of the shaft. The inner pockets are divided into first and second axially spaced portions so that any axial misalignment between the sleeves and the bearing will increase the flow path between the bearing and the shaft along one edge of the sleeve and decrease the flow path along the opposite edge to produce a pressure differential thereby automatically aligning the sleeve and shaft.

BACKGROUND OF THE INVENTION

The present invention relates generally to fluid translating devices and more particularly to an improved method and apparatus for supporting the rotating element in the fixed element of such devices.

Fluid translating devices of the type to which this invention pertains are common in the prior art. One such device is commonly referred to as a vane type pump which includes vanes that are slidable in a rotor and in contact with the peripheral surface of a working chamber formed in a housing supporting the rotor. Generally, the rotor is supported within the working chamber by a shaft extending into a bore intersecting the working chamber in the housing.

In a vane pump of this type, it has been customary to have the working chamber movable relative to the fixed rotating rotor so as to increase and decrease the flow of fluid between inlet and outlet ports respectively communicating with the working chamber. In fact, it has been common to allow the circular working chamber to be moved radially on opposite sides of the axis of rotation of the rotor to thereby reverse the direction of flow of fluid between the respective ports.

While these types of pumps have found considerable commercial acceptance in recent years, their use has been restricted to comparatively small units in which the rotor can be carried by available commercial ball or roller bearings. However, in larger units the radial forces exerted on the rotor are too great for this type of bearing. Therefore, their use has been considerably restricted by some of the ancillary elements which necessarily form a part of the fluid translating device. One of the problems encountered in previously known pumps of this type, which restricted the use thereof, was the bearings which supported the shaft within the housing of the pump. Generally, such bearings are in the form of roller bearings or equivalent devices which are subject to distortion when extreme radial forces are applied to the rotor shaft. Therefore, the use of other types of bearings, such as hydrodynamic or hydrostatic bearings, has been attempted.

While fluid bearings of the hydrostatic or hydrodynamic type have been known for years, these bearings have not found any degree of commercial success for utilization in pumps of the above-mentioned type. One of the problems encountered in hydrostatic bearings heretofore known is that the bearings required a separate source of pressurized fluid of considerable pressure and virtually no contamination so as to be operative for its intended purposes.

Fluid bearings of this type are discussed in an article entitled "Practical Design Applications for Hydrostatic Lubrication" by T. L. Corey and E. M. Kipp appearing in the March 1955 issue of Machine Design.

BRIEF SUMMARY OF THE INVENTION

According to the present invention, a rotating element or shaft is supported within a housing of a fluid translating device in such a manner that the fluid translated by the device is utilized to help support the rotating element. The rotating element is supported for rotation about a fixed axis by primary bearing means and the varying radial loads on the rotating element, resulting from reaction forces developed by the fluid, are absorbed by secondary bearings means. Stated another way, the reaction forces on the rotating element, from the fluid in the high pressure area are counteracted by diverting some of the fluid from the high pressure or outlet port to secondary bearing means positioned adjacent an area of the rotating element which is located adjacent the low pressure area or inlet port to pressure balance the rotating element.

The secondary bearing means or apparatus for producing the counterbalancing forces and auxiliary supporting the rotating element within the fixed element of the fluid translating device is in the form of a bearing sleeve having an outer pocket formed between the housing and the bearing sleeve and a pair of axially spaced inner pockets formed between the bearing seeve and the rotating element.

The inner pockets are defined on circular segments which each have substantially equal to the radius of the shaft and the centers of the segments are spaced from each other. The pressurized fluid from the high pressure port is directed to an outer pocket, which is located in opposed relationship to the pressurized area, and to the inner pockets to produce a counter-balancing force for the reaction forces on the rotating element at the high pressure area. The inner pockets communicate with the cavity adjacent the sleeves through small clearances or flow paths formed between the bearing sleeve and the rotating element or journal while the outer diameter of the sleeve is slightly smaller than the diameter of the bore so that the bearing sleeve is floatingly supported by the fluid retained in the inner pockets.

In order to provide a support mechanism for a reversible flow vane type fluid translating device, the bearing sleeve has a plurality of circumferentially spaced outer pockets and more particularly first and second pairs of diametrically opposed outer pockets which are respectively aligned with the two circular segments and are located adjacent the high and low pressure areas of the fluid translating device. The fluid from the low pressure port is directed to the pockets located adjacent the high pressure area while the fluid from the high pressure port is diverted to the pockets located adjacent the low pressure area. Thus, the arrangement provides a balancing force for any reaction forces produced in either of the ports.

The specific bearing construction is in the form of a sleeve formed integrally or in sections with the peripheral surface of the sleeve having four circumferentially spaced recesses with a pair of outer recesses aligned with each of the circular segments. The internal surface of the sleeve has a pair of axially spaced recesses in opposed relationship to each of the outer recesses and each pair of inner recesses is in communication with an outer recess. The inner recesses are separated by a portion of the bearing sleeve which has laterally offset circumferentially spaced segments and a slot is provided between at least some of the adjacent pairs of inner recesses. The laterally offset segments will insure that all portions of the shaft are exposed to lubrication. The slots extending axially between opposed edges of the sleeve will prevent thermal expansion of the metal between the inner pockets caused by a build-up in the temperature of the metals when the sleeve and shaft are close to each other or in contacting relation.

The communication between each of inner recesses and its respective outer recess is restricted so that fluid flow there through will not take place without a drop in the fluid pressure. Thus, the pressure in the outer recess will be higher than that in the inner recesses. With this arrangement, the sleeve will always move to that position in which the flow of fluid out of the inner recesses through the clearance betwen the sleeve and rotating member will be equal to the flow into the inner recesses through the restricted communication from the outer recess. The circular segments will insure that the flow from each portion of the recesses will be equal because it will produce an equal clearance between all portions of the respective segments and the shaft. The rates of flow, the position of the sleeve, and the size of the clearance will vary according to the pressure in the translator and accordingly the support given to the rotating element will be that which is required to counterbalance the force thereon generated by this pressure.

The groups of inner first and second chambers formed between the gearing sleeve and the shaft will automatically compensate for any axial misalignment between the shaft and the sleeve. This necessarily results from the fact that when there is axial misalignment between the sleeve and the bearings, the flow from one of the inner chambers is greater than the flow from the other of the chambers to thereby produce a pressure differential between the chambers which will automatically cause the sleeve and shaft to assume an axially aligned position.

Thus, the sleeve having internal recesses is caused to automatically adjust its position relative to the bearing journal to modify the flow of pressurized fluid supporting the journal out of the recesses thus maintaining the pressure therein at the proper level to sustain a fluctuating load on the shaft without radial movement of the journal, carried by the shaft.

DETAILED DESCRIPTION

Figure 2:
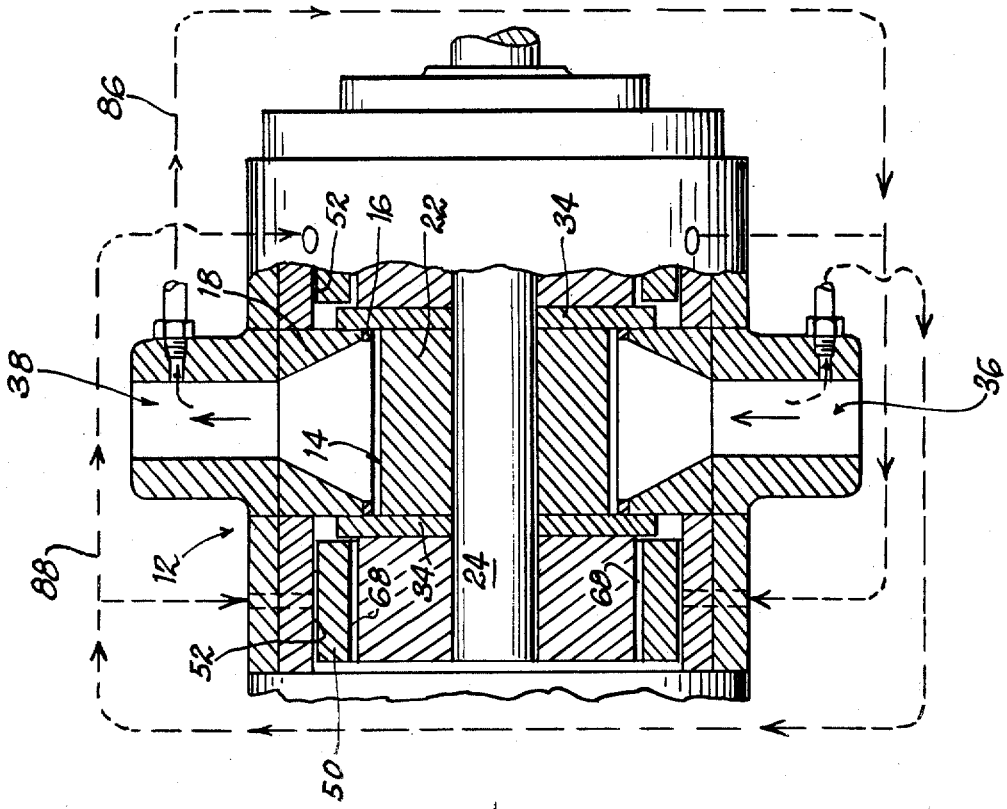
FIG. 2 is a fragmentary vertical sectional view taken generally along line 2—2 of FIG. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Figure 1:
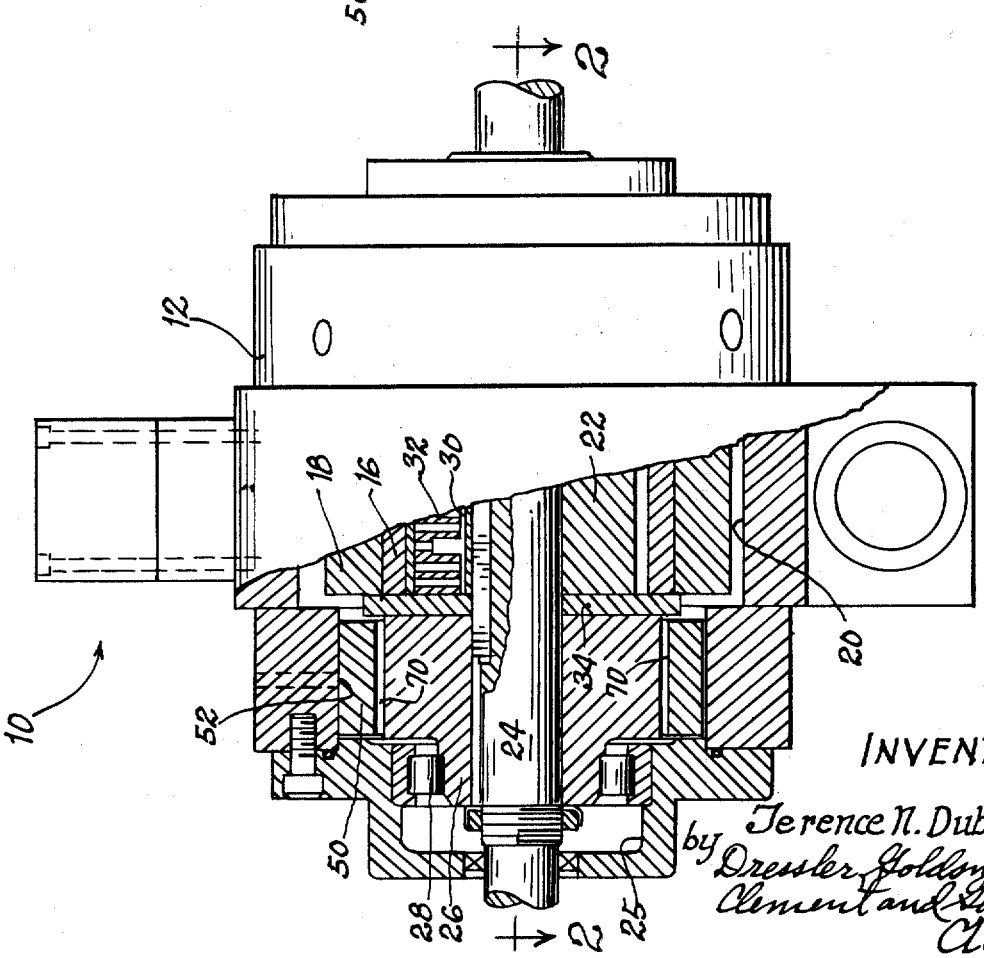
FIG. 1 is a side elevational view, partly in section, showing a fluid translating device having the present invention incorporated therein.
Figure 3:
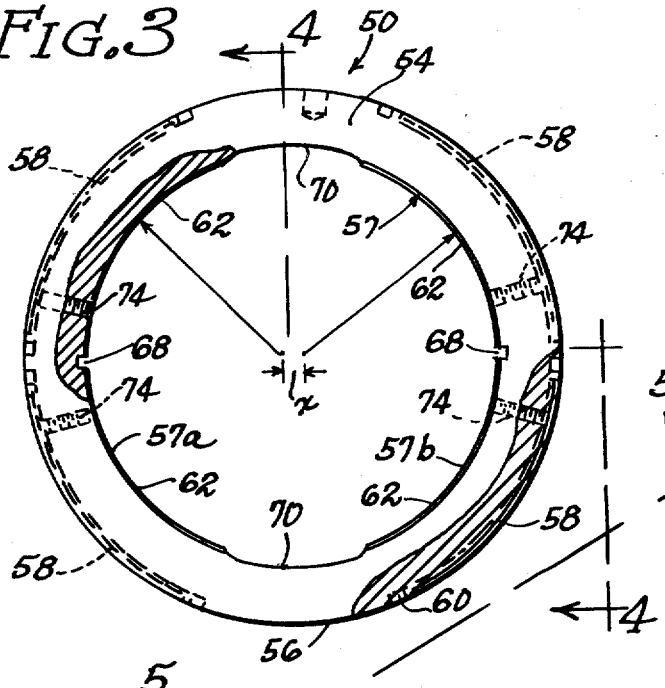
FIG. 3 is an end view of the bearing constructed in accordance with the present invention.
Figure 4:
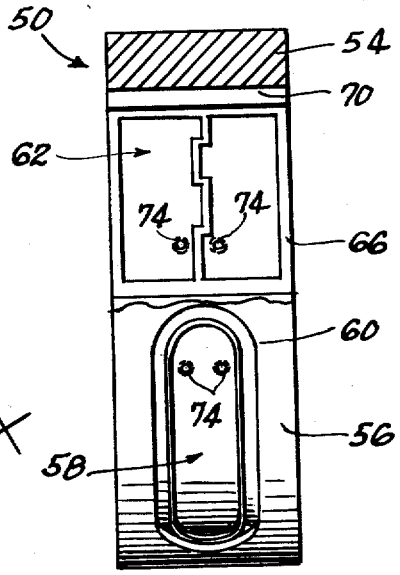
FIG. 4 is a view, partly in section, taken generally along line 4—4 of FIG. 3.
Figure 6:
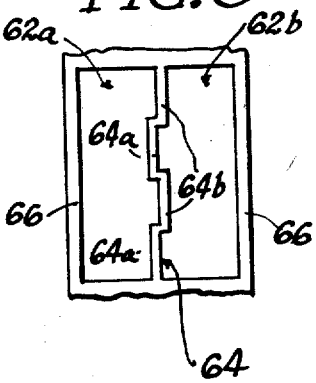
FIG. 6 is a projected view of a portion of the internal surface of the bearing shown in FIG. 3.
Figure 5:
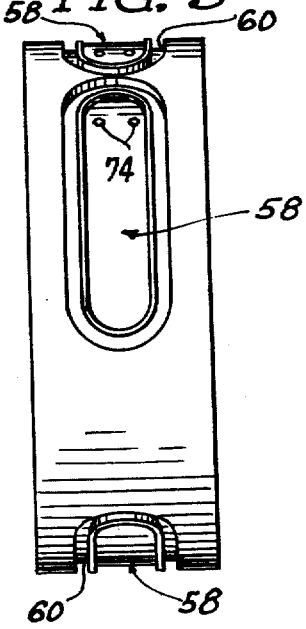
FIG. 5 is a side elevational view of the bearing as viewed along line 5—5 of FIG. 3.
Figure 7:
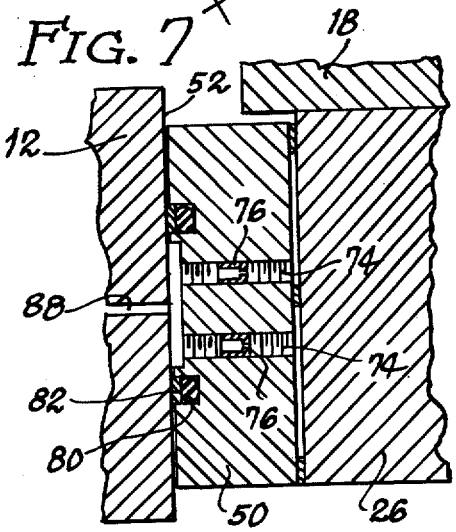
FIG. 7 is an enlarged fragmentary sectional view of the bearing in its assembled condition between a rotating and a fixed element.

FIGS. 1 and 2 of the drawings disclose a fluid translator unit or device, generally designated by the reference numeral 10. The unit or fluid translating device 10 is illustrated as a reversible flow vane type pump which includes a housing 12 having a working chamber 14 defined therein by a cam ring 16 which is supported in an opening in a camblock 18. The camblock 18 is vertically shiftable in an opening 20 defined within the housing 12, for a purpose which will be explained later.

The fluid translating device further includes a rotor 22 keyed to a shaft 24 which is supported for rotation about a fixed axis in a bore 25 by bearing journals 26 received in roller bearings or primary bearing elements 28. The rotor or rotating element has a plurality of circumferentially spaced radially extending slots 30 each of which slidably supports a vane 32. The rotating element further includes a pair of end plates 34 respectively keyed to the shaft 24 and adapted to cooperate with the cam ring and the camblock to seal the opposite ends of the chamber 14.

The working chamber 14 is adapted to receive fluid through a first or low pressure passage 36 formed in the housing 12, the camblock 18 and cam ring 16 and deliver the fluid at an elevated pressure to the second or high pressure passage 38. Such a condition occurs when the axis of the working chamber 14 is located above the axis of the shaft 24. However, if the working chamber is vertically shifted by the vertical movement of the camblock 18 and cam ring 16 so as to locate the working chamber axis below the axis of the shaft, the direction of flow of fluid through the working chamber would be reversed and the passage 36 would become the outlet passage while the passage 38 would be the inlet passage.

As was indicated above, one of the problems encountered in producing large pumps of this type, which are capable of delivering fluid at relatively high outlet pressures, is that the bearings 28 tend to distort and render the pump inoperative. Furthermore, the limitations regarding close tolerances and the separate supply of pressurized fluid has also limited the use of hydrostatic bearings for supporting the rotating element within the housing of the pump. It is well known that the necessity of having very close tolerances in commercial production machines greatly increases the costs thereof. Even assuming that the close tolerances could be formed for a hydrostatic bearing, the reaction forces produced in the outlet passage on the rotor 22 would create eccentricity between the shaft and bearing axes causing the rotating shaft to move closer to the bearing surface, which would result in metal-to-metal contact and produce increased temperatures resulting in destruction of the entire device.

According to the present invention, the above problems encountered by normal roller type bearings or by hydrostatic bearings has been alleviated by utilizing a secondary bearing element which is floatingly supported between the housing and the rotating shaft with the fluid to the secondary element or bearing supplied by diverting fluid, which is translated by the device, in a manner to automatically compensate for the extreme reaction forces on the rotor resulting from the build-up of pressure in the outlet port.

According to the invention, first and second secondary bearings 50 are respectively interposed between enlarged portions 52 of the bore 25 and the bearing journals 26 supported on the shaft 24. The enlarged portions 52, which are in axial alignment with the axis of the working chamber 14, are slightly larger than the peripheral size of the bearings and extend on opposite sides of the opening 20 for receiving the camblock 18.

One bearing 50 is shown in detail in FIGS. 3–6 and includes a member or sleeve 54 having an outer surface 56 and an inner surface 57. The outer surface 56 has a plurality of circumferentially spaced recesses 58 with each of the recesses 58 being circumscribed by a groove 60 and the periphery of the sleeve is slightly smaller in diameter than the diameter of the bore 52, for a purpose which will be described later. The inner surface 57 likewise has a plurality of circumferentially spaced recesses 62 each of which is in opposed relationship to one of the outer recesses 58.

Each of the inner recesses 62 is divided into first and second axially spaced portions 62a and 62b which are separated by a portion 64 of the internal surface 57 of the sleeve. The separating portion 64 is divided into laterally offset or axially spaced segments 64a and 64b, for a purpose to be described later. Each of the spaced portions 62a and 62b of the inner recess has its outer edge axially spaced from the edge of the sleeve or member 56 by a portion 66 of the internal surface 57 of the sleeve which defines what is termed as a sill area. Also, each of the outer recesses 58 is in communication with a pair of inner recesses 62a and 62b through openings 74.

Furthermore, the internal surface 57 of the bearing sleeve 54 has first and second diametrically opposed axially extending slots 68 and is divided into first and second portions 57a and 57b by cutout portions 70. Each of the surfaces 57a and 57b define circular segments having radii of equal length. However, the centers of the respective circular segments 57a and 57b are spaced from each other by a small dimension indicated by the reference numeral x (FIG. 3), for a purpose which will be described later.

In the assembled condition, the bearing sleeves 54 are positioned within the bore 52 defined in the housing 12 so that the respective diametrically opposed slots 68 are located substantially in alignment with the respective passages or ports 36 and 38. This will locate the cutout portions 70 above and below the inlet and outlet ports and will provide a spacing between the bearing sleeves 54 and the bearing journal 26, for a purpose which will be described later. The radial portions 57a and 57b will, therefore, be located adjacent the respective ports 36 and 38.

Figure 8:
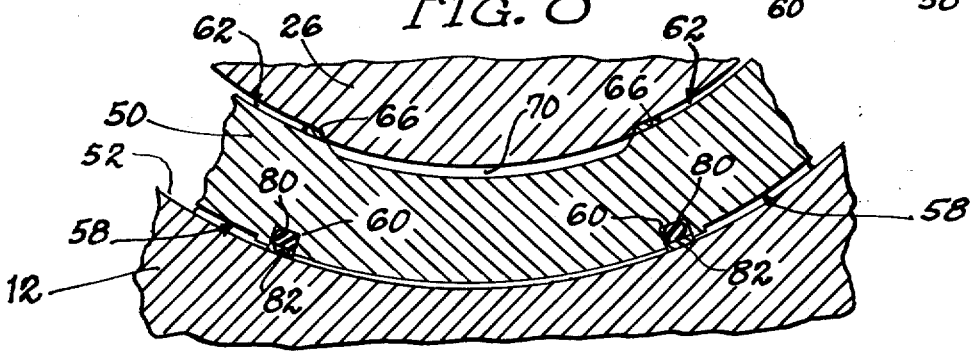
FIG. 8 is an enlarged longitudinal sectional view of the bearing supported between the fixed element and the rotating element.

Also, in the assembled condition see FIG. 8, the grooves 60 receive O-rings 80 and anti-extrusion rings 82 with the O-rings 80 and the anti-extrusion rings 82 cooperating to seal the areas surrounding each of the outer recesses 58. Thus, each of the outer recesses 58 produces a pocket or chamber disposed adjacent the surface of the bore 52 in the housing 12. Also, the internal surface 57 of the member 54 cooperates with the peripheral surface of the bearing journal 26 so that the recesses 62, more specifically each of the ports 62a and 62b, define pockets or chambers between the bearing journal 26 and the member 54.

As was indicated above, the respective pockets or chambers are adapted to receive pressured fluid to produce forces on the shaft which counterbalance the reaction forces on the shaft resulting from the pressured fluid in that area of working chamber 14 in communication with the outlet port of the pump. For this purpose, the pair of circumferentially spaced outer recesses or pockets 58, which are located adjacent the area of working chamber 14 in communication with the inlet port 36, are connected to the outlet port 38 through conduit means 86 (FIG. 2).

Likewise, the remaining two circumferentially spaced outer pockets 58, which are located adjacent the area of working chamber 14 in communication with the outlet port 38, are connected through conduit means 88 to the inlet port 36 of the pump.

In this manner, the conduit means 86, as well as the pockets or chambers 58 and the openings 74, constitute means for supplying fluid from the outlet or second port 38 to the inner pockets 62a and 62b to produce forces on the bearing journals 26 and thus the rotor 22 counterbalancing the reaction forces produced on the opposite side of the rotor 22 by the fluid at the elevated pressure in the area of working chamber 14 in communication with the port 38. Furthermore, the pressured fluid at the inlet port is directed to the remaining pair of outer pockets for each of the bearing sleeves, which are located adjacent the outlet port 38 and produce a balancing force for any reaction forces resulting on the rotor from the fluid in the inlet port. With such an arrangement, the reaction forces in either of the ports are balanced by opposing forces on the bearing journals 26 regardless of the direction of flow of fluid through the pump or the pressure of the fluid in either of the ports.

Furthermore, the internal configuration of the sleeve 54 and the variations in diameters between the bore and the outer surface of the sleeve results in a self-centering of the sleeves between shaft 24, more particularly the bearing journals 26, and the bore 52. Since the circular segments of the internal surface 57 each have a radius substantially equal to one-half the diameter of the shaft, more particularly the bearing journal 26, forming part of the shaft 24, and the centers of the respective segments are spaced by the transverse dimension x, the bearing sleeve 54 is capable of being shifted transversely of the axis of the shaft as the forces resulting from the pressured fluid reach an unbalanced state. The spacing x between the respective radii of the portions 57a and 57b results in a small clearance between the internal surface of the sleeves and shaft which define flow paths from the recess portions 62a and 62b across the sill areas while the sealing means 80, 82 prevent flow of fluid between the bore and the sleeves.

The circular segments, which have their radii spaced by a small dimension, will insure that the clearance between the shaft and the entire circumferential distance [of each] of *one segment* [segments] is *substantially* equal, *when the center of the one segment generally coincides with the center of the shaft,* so that the flow of fluid at various locations along the segment is the same. This arrangement will overcome the disadvantage of using a sleeve having a diameter larger than the diameter of the shaft. In a sleeve with a circular opening, as the opening of the sleeve is displaced from a coaxial position with the shaft, the clearance between the shaft and the sleeve will vary at different points on a semi-circular portion of the sleeve *at the most critical time when the sleeve and shaft are almost touching at the horizontal axis aligned with a port 36 or 38* and will result in uneven flow from the pockets, which will preclude having equal forces between the sleeve and the shaft.

Thus, assuming that there is an increase in the pressure of the fluid in the outer pockets resulting from an increase in the pressure of the fluid in the outlet port 38, the size of the flow paths from the respective inner pockets formed by recess portions 62a and 62b adjacent the inlet port will decrease while the size of the flow paths from the inner pockets adjacent the outlet ports will increase. This will result in a decreased force between the shaft 24 and the sleeve adjacent the outlet port and an increased force between the shaft and sleeves adjacent the inlet port 36 and in the inner pockets adjacent the outlet port. With such an unbalanced condition, the increased forces on the sleeve adjacent the inlet port will tend to move the sleeve towards the inlet port until a balanced condition is reached. With such an arrangement, the sleeves 54 will be floatingly supported between the shaft and the housing and will absorb radial forces which would normally be absorbed by the shaft.

Another advantageous feature of the present invention is that the division of the pockets axially on the member 54 will automatically maintain a true axial relationship between the sleeve 54 and the shaft 24. Thus, assuming for any reason, that the bearing sleeve 54 is tilted relative to the axis of the shaft 24, such a condition will cause an increase in the size of the flow path from one of the pockets and a decrease in the size of the flow path of the adjacent pocket. Such a difference in the flow from the respective pockets will again cause a differential pressure in the respective adjacent pockets which will then tend to shift the sleeve relative to the bearing journal to ultimately result in axial alignment of the sleeve and shaft.

The slots 68, described above, perform an important function in insuring that the internal surface 57 of the bearing sleeve will not have a sufficient increase in temperature to result in distortion of the bearing which would result in ultimate failure of the entire pump. Assuming, for example, that one of the surfaces, surface 57a, where located in close proximity to the exterior surface of the shaft or bearing journal 26, such a condition might result in a sufficient increase in temperature of the metal between the circumferentially spaced inner pockets 62 adjacent one of the ports to thereby result in an expansion of the metal of sufficient magnitude to produce a continuous surface-to-surface contact between the bearing sleeve and the bearing journal which would result in ultimate destruction of the shaft and/or the sleeve. However, by providing the axially extending slots 68 between each pair of internal pockets located on opposite sides of the center of the pump, the slots 68 will allow expansion of the metal in this area without any distortion of the sleeve towards the bearing journal.

Another important feature of the bearing constructed in accordance with the present invention is that each portion of the bearing journal is assured of lubrication by the supporting fluid. This is accomplished by having the internal surface of the bearing, which divides the inner recesses into sections 62a and 62b, comprised of segments axially offset from each other. Thus, the recess areas will have axially overlapping sections which permit the pressurized fluid contained therein to contact and lubricate that portion of the bearing journal adjacent to the dividing sill. Pressure induced flow out of the recesses passing through the clearances will lubricate the bearing journals in the area of the outer sills.

Another important feature of the present invention is the relative size of the outer and inner pockets as well as the location of the pockets with respect to the respective ports. It is preferable that the outer pockets have a projected area which is less than the projected area of the associated inner pockets and more specifically that the outer pocket projected area be slightly smaller than the projected area of the inner pockets as well as the sill areas on opposite ends of each of the pockets. This insures that the force developed in the outer pocket will not overcome that in the inner pockets and consequently thrust the sleeve into direct contact with the bearing journal.

Furthermore, while not absolutely necessary to the practice of the present invention it is desirable to specifically locate the outer pockets relative to the path of flow of the fluid through the pump to insure that (1) the portions of bearing sleeves located above and below the path of flow through the pump will not be distorted towards each other; and (2) that the portion of the bearing sleeves adjacent the path of flow will not be distorted towards each other. If the pockets do not extend a required circumferential distance on the opposite sides of the respective ports, the resultant forces from the fluid in the outer pockets will tend to move the opposed segments towards each other and ultimately result in metal-to metal contact along the inner surface of the bearing sleeve and the outer surface of the bearing journal. Such a condition would cause a complete destruction of the shaft and/or the bearing sleeve. Alternatively, if the circumferential extent of the outer pockets is too great, the forces resulting from the pressured fluid above and below the path of flow through the pump will tend to distort the upper and lower portions of the bearing sleeve towards each other and again result in metal-to-metal contact. Thus, it is desirable that the respective pockets 58 terminate at a point which is spaced a predetermined circumferential distance from a plane extending vertically between the inlet and outlet ports. Such a spacing is preferably on the order of 20–25° arc between the vertical plane and the adjacent edge of the pocket.

The illustrative embodiment shows a pair of outer pockets on each side of the recessed portions 70 with each pair to be located adjacent the respective ports. This will result in a complete balance of the rotor within the working chamber. It is to be understood that the respective pairs of pockets could be replaced with single pockets covering substantially the same circumferential area without departing from the spirit of the invention.

What is claimed is:

1. In combination with a fluid translator unit having a rotor assembly including a shaft and a housing with primary bearing means supporting said rotor assembly for rotation about a fixed axis in said housing to translate fluid between spaced ports, secondary bearing means between said housing and shaft for counterbalancing reaction forces on said rotor assembly from the pressure of fluid translated through said device and including at least one member supported for radial movement relative to said shaft, said at least one member having an internal surface cooperating with said shaft to define chambers, said internal surface having opposed arcuate segments each having a radius substantially equal to one-half the diameter of said shaft with centers of said segments spaced from each other; means defining outer pockets between said member and said housing with said pockets being in communication with said chambers; and means for supplying pressurized fluid to said pockets whereby to flow into said chambers and from said chambers between said shaft and internal surface.

2. In a fluid translator unit having a rotor supported in a housing by a shaft; means supporting said shaft for rotation about a fixed axis in said housing to translate fluid between first and second ports, the improvement of a hydrostatic bearing between said shaft and said housing and movable radially of said shaft, said bearing having an inner surface including first and second circular segments each having a radius substantially equal to one-half the diameter of said shaft, said circular segments having spaced centers; means defining at least one recess in each of said segments, means defining at least one pocket on said outer surface for each of said recesses with communication means between said recesses and pockets and means for supplying pressured fluid to said pockets whereby to flow to said recesses and from said recesses between said shaft and said inner surface.

3. A hydrostatic bearing comprising a sleeve having an inner surface, said surface having first and second substantially semi-circular, opposed segments having equal radii, said segments having centers spaced from each other, and means defining recesses in each of said segments for receiving pressured fluid whereby, when located between a support and a rotating shaft having a radius equal to said segments, [said segments will produce an] *a substantially* equal clearance *will be produced* between all portions of [the respective segments] *one segment* and the shaft *when the center of said one segment generally coincides with the center of the shaft.*

4. A hydrostatic bearing as defined in claim 3, in which said sleeve has an outer surface with at least one outer pocket in said outer surface for each segment and communication means between said pockets and said recesses.

References Cited

The following references, cited by the Examiner, are of record in the patented file of this patent or the original patent.

UNITED STATES PATENTS

| | | | |
|---|---|---|---|
| 1,079,384 | 11/1913 | Wilson | 418—73 |
| 2,663,977 | 12/1953 | Gerard et al. | 308—9 |
| 2,746,394 | 5/1956 | Dolza et al. | 418—73 |

| | | | |
|---|---|---|---|
| 3,034,446 | 5/1962 | Brundage | 418—73 |
| 3,134,336 | 5/1964 | Huffman et al. | 418—73 |
| 3,153,384 | 10/1964 | Castle et al. | 418—73 |
| 3,276,676 | 10/1966 | Buske | 308—9 |

FOREIGN PATENTS

| | | | |
|---|---|---|---|
| 957,612 | 5/1964 | Great Britain | 308—122 |

JOHN J. VRABLIK, Primary Examiner

U.S. Cl. X.R.

308—122; 418—102